US 6,403,743 B1

(12) United States Patent
Clark et al.

(10) Patent No.: US 6,403,743 B1
(45) Date of Patent: Jun. 11, 2002

(54) PETROLEUM RESINS AND THEIR PRODUCTION WITH SUPPORTED CATALYST

(75) Inventors: James Hanley Clark, York (GB); Kenneth Lewtas, Tervuren (BE); Jennifer Katie Shorrock, Melksham (GB); Maria Leonor Garcia, Brussels (BE); Karen Wilson, York; Janet Chisem, Warrington, both of (GB)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 09/619,196

(22) Filed: Jul. 19, 2000

Related U.S. Application Data

(60) Provisional application No. 60/153,811, filed on Sep. 14, 1999, and provisional application No. 60/153,663, filed on Sep. 14, 1999.

(51) Int. Cl.⁷ .................................................. C08F 10/00
(52) U.S. Cl. .................... 526/290; 526/77; 526/346; 526/348.2; 526/348.5; 526/348.6; 526/226; 502/231
(58) Field of Search ................... 526/77, 346, 348.2, 526/348.5, 348.6, 226, 290; 502/231

(56) References Cited

U.S. PATENT DOCUMENTS

| | | | |
|---|---|---|---|
| 3,248,343 A | * 4/1966 | Kelly et al. | 502/231 |
| 4,328,090 A | 5/1982 | Stuckey, Jr. et al. | 208/44 |
| 4,500,424 A | 2/1985 | Simpson et al. | 208/216 |
| 4,629,766 A | 12/1986 | Malatesta et al. | 525/222 |
| 4,686,030 A | 8/1987 | Ward | 208/216 |
| 4,846,961 A | 7/1989 | Robinson et al. | 208/216 |
| 4,849,093 A | 7/1989 | Vauk et al. | 208/143 |
| 5,017,714 A | 5/1991 | Welborn, Jr. | 556/12 |
| 5,055,438 A | 10/1991 | Canich | 502/117 |
| 5,096,867 A | 3/1992 | Canich | 502/103 |
| 5,153,157 A | 10/1992 | Hlatky et al. | 502/117 |
| 5,171,793 A | 12/1992 | Johnson et al. | 525/332.1 |
| 5,198,401 A | 3/1993 | Turner et al. | 502/155 |
| 5,240,894 A | 8/1993 | Burkhardt et al. | 502/108 |
| 5,264,405 A | 11/1993 | Canich | 502/103 |
| 5,324,800 A | 6/1994 | Welborn, Jr. et al. | 526/160 |
| 5,451,704 A | * 9/1995 | Ho et al. | 585/512 |
| 5,502,104 A | 3/1996 | Hohner et al. | 524/556 |
| 5,507,475 A | 4/1996 | Seel et al. | 267/64.12 |
| 5,656,698 A | * 8/1997 | Hentges et al. | 525/327.9 |
| 5,820,749 A | 10/1998 | Haluska et al. | 208/216 |

FOREIGN PATENT DOCUMENTS

| | | |
|---|---|---|
| CA | 1268753 | 5/1990 |
| EP | 0 082 726 B | 4/1986 |

(List continued on next page.)

OTHER PUBLICATIONS

Peter T. Tanev and Thomas J. Pinnavaia, "A Neutral Templating Route to Mesoporous Molecular Sieves" *Science*, v.267, Feb. 10, 1995, pp. 865–867.

James H. Clark, et al., "Environmentally Friendly Catalysis Using Supported Reagents: Evolution of a Highly Active Form of Immobilised Aluminium Chloride", *J. of Chem. Soc., Chem. Commun.* (1995), pp. 2037–2040.

C.T. Kresge, et al., "Ordered Mesoporous Molecular Sieves Synthesized by a Liquid–Crystal Template Mechanism", *Nature*, v.359(6397), Oct. 22, 1992, pp. 710–712.

*Primary Examiner*—David W. Wu
*Assistant Examiner*—William K Cheung
(74) *Attorney, Agent, or Firm*—Charles E. Runyan

(57) ABSTRACT

Petroleum resins are produced by using a supported halide based Lewis acid polymerization catalyst wherein the Lewis acid is chemically bound to the support and free hydrogen halide and/or alkane formed by the reaction of the Lewis acid with the support has been removed. The more active catalysts are useful with both pure monomer and mixed feeds.

15 Claims, 2 Drawing Sheets

FOREIGN PATENT DOCUMENTS

| | | |
|---|---|---|
| EP | 0 277 003 A | 8/1988 |
| EP | 0 277 004 A | 8/1988 |
| EP | 0 129 368 B | 7/1989 |
| EP | 0 426 637 B | 4/1995 |
| EP | 0 520 732 B | 12/1995 |
| EP | 0 570 982 B | 1/1997 |
| EP | 0 495 375 B | 2/1997 |
| EP | 0 865 823 A | 9/1998 |
| EP | 0 500 944 B | 10/1998 |
| EP | 0 573 403 B | 11/1998 |
| WO | WO 91/09882 | 7/1991 |
| WO | WO 92/00333 | 1/1992 |
| WO | WO 93/03093 | 2/1993 |
| WO | WO 94/03506 | 2/1994 |
| WO | WO 94/26816 | 11/1994 |
| WO | WO 95/12623 | 5/1995 |
| WO | WO 95/26818 | 10/1995 |
| WO | WO 96/26787 | 9/1996 |
| WO | WO 98/30587 | 7/1998 |
| WO | WO 98/57999 | 12/1998 |

\* cited by examiner

PETROLEUM RESINS AND THEIR PRODUCTION WITH SUPPORTED CATALYST

This application claims benefit of Provisional Application Nos. 60/153,811 and 60/153,663 both filed on Sep. 14, 1999.

The present invention is concerned with the production of petroleum resins. In particular the invention is concerned with the discovery that particular catalysts are extremely active catalysts for the polymerization of a variety of resin feeds, including those feeds that are traditionally difficult to polymerize. The invention is particularly concerned with the improvement in the yield of resins and the reduction in unwanted or hazardous waste produced during resin production.

Petroleum resins are well known and are produced by the Friedel-Crafts polymerization of various feeds, which may be pure monomer feeds or refinery streams containing mixtures of various unsaturated materials. Generally speaking, the purer the feed the easier to polymerize. For example pure styrene, pure alpha methyl styrene and mixtures thereof are easier to polymerize than a $C_8/C_9$ refinery stream. Similarly, pure or concentrated piperylene is easier to polymerize than $C_4$ to $C_6$ refinery streams. These pure monomers are however more expensive to produce than the refinery streams which are often by-products of large volume refinery processes.

Hydrocarbon resins are used in adhesives, rubbers, hot-melt coatings, printing inks, paint, flooring, and other applications. The resins are usually used to modify other materials.

Aliphatic hydrocarbon resins can be prepared by cationic polymerization of a cracked petroleum feed containing $C_4$, $C_5$ and $C_6$ paraffins, olefins, and diolefins also referred to as "$C_5$ monomers". These monomer streams are comprised of cationically polymerizable monomers such as butadiene, 1,3-pentadiene (piperylene) along with cyclopentene, pentene, 2-methyl-2-butene, 2-methyl-2-pentene, isoprene, cyclopentadiene, and dicyclopentadiene. In order to obtain these feeds the refinery streams are purified usually by both fractionation and treatment to remove impurities.

In addition to the reactive components, non-polymerizable components in the feed include saturated hydrocarbons that can be co-distilled with the unsaturated components such as pentane, cyclopentane, or 2-methyl pentane. This monomer feed can be co-polymerized with other $C_4$ or $C_5$ olefins or dimers. To date however, it has been necessary to purify the feeds to remove unsaturated materials that adversely affect the polymerization reaction or cause undesirable colours in the final resin (for example isoprene). This is generally accomplished by fractionation. To date polymerizations are catalysed using Friedel-Crafts polymerization catalysts such as unsupported Lewis acids (e.g., boron trifluoride ($BF_3$), complexes of boron trifluoride, aluminium trichloride ($AlCl_3$), or alkyl aluminium halides, particularly chloride).

Generally, $C_5$ aliphatic hydrocarbon resins are synthesised using a piperylene concentrate stream that is obtained by fractionation to enrich the piperylene content and to reduce the content of olefins and diolefins that are more difficult to polymerize. The presence of these components in significant quantities (i.e. greater than 3 to about 5%) in polymerization feed blends is known to adversely affect the molecular weight and properties of the resin produced via cationic polymerization. However, obtaining these feedstocks has required expensive purification procedures.

Therefore, there is a need in the art to provide a method of polymerising mixed feeds containing a variety of $C_4$ to $C_6$ olefins and diolefins into hydrocarbon resins without forming undesirable gels or very high molecular weight materials.

In our PCT Application WO 98/57999 we describe how raw feeds, which contain undesirable monomers, can be converted into hydrocarbon resins using traditional Friedel-Crafts catalysts providing a certain amount of aromatic olefin is added to the feed.

The process of WO 98/57999 however has several disadvantages. The Friedel-Crafts catalysts that have been used are typically aluminium based such as aluminium trichloride or boron based such as boron trifluoride. These homogenous catalysts suffer from the disadvantage that they become incorporated into the resin and must be removed by washing, which in turn produces hazardous waste water causing disposal problems. Furthermore, the catalysts themselves are hazardous and must be handled with care.

It has been suggested in PCT publication WO 95/26818 that supported Lewis acid catalysts may be used for hydrocarbon conversion reactions including the polymerization of unsaturated monomers such as piperylene. More recently, PCT publication WO 98/30587 is specifically concerned with supported metal halide catalysts (including aluminium trichloride) useful for the preparation of hydrocarbon resins from "purified" monomer feeds. We have found, however, that the supported catalysts of this PCT publication are not sufficiently active and versatile to polymerize the feeds containing the variety of $C_4$ to $C_6$ olefins and diolefins found in refinery streams.

We have now developed improved supported halide based Lewis acid catalysts which are extremely active catalysts comparable to the heterogeneous unsupported catalysts in polymerising both the diverse and complex refinery feeds and pure feeds. Use of these catalysts also reduces the need for polymer purification and minimises waste disposal problems.

Figure 1:
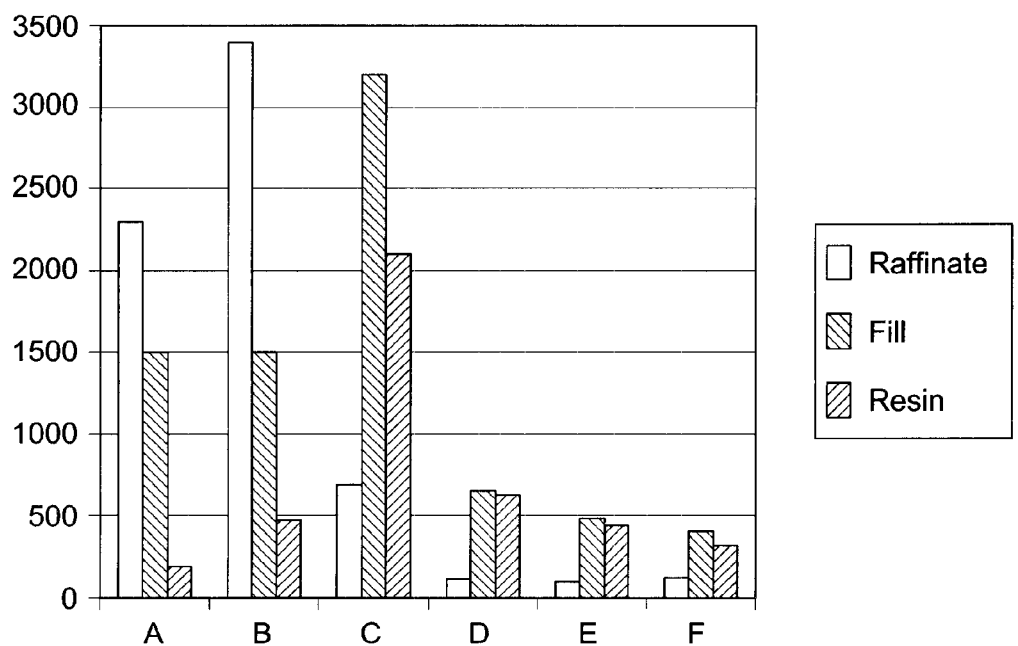
FIG. 1 is a bar graph showing chloride content for each of the examples A–F.

The present invention therefore provides a process for the production of petroleum resins in which a feed is contacted with a supported Lewis acid catalyst, wherein the Lewis acid catalyst comprises a metal or non-metal halide or alkyl halide bonded to a support containing surface hydroxyl groups, characterised in that hydrogen halides and/or alkanes formed by the abstraction of hydrogen from the surface hydroxyl groups of the support are removed prior to contacting the feed with the catalyst.

We have found that by reacting the Lewis acid with the support and removing free acids and/or alkanes so formed the catalysts are more active and are active with a range of feeds including those which have been more difficult to polymerize using previously proposed supported catalysts. It is also possible to more tightly control the molecular weight of the product, which has hitherto been difficult, particularly when using mixed feeds.

The invention is applicable to the polymerization of any feedstreams. It is however particularly useful in the polymerization of mixtures of aliphatic and aromatic feeds and feeds containing mixtures of olefins and diolefins. We have found that the supported catalysts are more versatile than the unsupported counterparts currently used in commercial operations.

Typically, the feedstream includes between 20 wt % and 80 wt % monomers and 80 wt % to 20 wt % of solvent. Preferably, the feedstream includes 30 wt % to 70 wt % monomers and 70 wt % to 30 wt % of solvent. More preferably, the feedstream includes 50 wt % to 70 wt % monomers and 50 wt % to 30 wt % of solvent. The solvent may include an aromatic solvent which may be toluene, xylenes, and aromatic petroleum solvents, or mixtures thereof The solvent may include an aliphatic solvent. The invention may further include recycling the solvent. The solvent may be the unpolymerizable component of the feed.

The feedstream may include at least $C_4$ to $C_6$ monomers, wherein cyclopentadiene and methylcyclopentadiene components may be removed from the feedstream by heating at a temperature between 100° C. and 160° C. and fractionating by distillation, although using the catalyst of this invention may obviate this need. The monomers may include at least one member selected form the group consisting of isobutylene, butadiene, 2-methyl-2-butene, 1-pentene, 2-methyl-1-pentene, 2-methyl-2-pentene, 2-pentene, cyclopentene, isoprene, cyclohexene, 1,3-pentadiene, 1,4-pentadiene, isoprene, 1,3-hexadiene, 1,4-hexadiene, cyclopentadiene, and dicyclopentadiene.

In accordance with another aspect, the feedstream includes 30 wt % to 95 wt % of $C_5$ monomers, as described above and 70 wt % to 5 wt % of a co-feed including at least one member selected from the group consisting of pure monomer, $C_9$ monomers, and terpenes. Preferably, the feedstream includes about 50 wt % to 85 wt % of $C_5$ monomers and about 50 wt % to 15 wt % of a co-feed, including at least one member selected from the group consisting of pure monomer, $C_9$ monomers, and terpenes.

We have found that the use of the specified catalyst allows the production of useful resin from a refinery stream typically containing:
 a) at least 2 wt % of isoprene
 b) at least 2 wt % of one or more of dicyclopentadiene, substituted cyclopentadienes and substituted dicyclopentadienes
 c) at least 2 wt % piperylene
 d) 0 to 94 wt % of additional aliphatic olefins, based upon the weight of the reactor feed blend
which as mentioned in PCT WO 98/57999 has hitherto been difficult to polymerize.

Preferred substituted cyclopentadienes are those substituted with a $C_1$ to $C_{10}$ linear, branched or cyclic alkyl group, preferably one or more methyl groups. Methylcyclopentadiene is a preferred substituted cyclopentadiene.

The term dicyclopentadiene is defined to include both the endo and exo forms of dicyclopentadienes. Preferred substituted dicyclopentadienes include dicyclopentadienes substituted with a $C_1$ to $C_{10}$ linear, branched or cyclic alkyl group, preferably one or more methyl groups.

The feed may also contain an aromatic olefin. Preferred aromatic olefins are styrene and derivatives of indene. Particularly preferred aromatic olefins include styrene, alpha-methyl styrene, beta-methyl styrene, indene, substituted indenes such as methylindenes and vinyl toluenes. The aromatic olefins are typically present at 1 to 50 wt %, even more preferably 1 to 30 wt %, even more preferably 1 to 10 wt % of the total feed.

Examples of Lewis acids to which this invention applies are metal and non-metal halides and alkyl metal halides including chlorides, bromides and fluorides. Typical examples include aluminium trichloride and alkyl aluminium halides of formula $R_mAlCl_n$ where m plus n equals 3 and n is 1 or 2, the halides of other metals and non-metals such as zinc, boron, iron, tin, zirconium, titanium, hafnium, antimony, tantalum, scandium, yttrium, lanthanum and niobium may also be used.

The preferred Lewis acid used in the present invention is aluminium trichloride and the preferred method to produce such aluminium chloride catalysts is described in J. Chemistry Society Chemical Communications 1995, pages 2037 to 2040, PCT Patent Application WO 96/26787 and European Patent publication 865823.

The nature of the support is important and should be chosen according to the nature of Lewis acid used and the desired resin properties. It should contain surface hydroxyls so that it reacts with the halogen of the Lewis acid and preferably produces Bronsted and Lewis acid sites bonded to the support surface. Examples of suitable supports include silica, synthetic silicas (MCM), hexagonal mesoporous silica (HMS), as described in Nature 1992 359 Page 710 and 1995 Science 267 Page 865 clay, including naturally occurring clay minerals—such as kaolinite, bentonite, attapulgite, montmorillonite, clarit, Fuller's earth, hectorite, and beidellite; synthetic clay such as saponite and hydrotalcite; montmorillonite clay treated with at least one member selected from the group consisting of sulphuric acid and hydrochloric acid; and modified clay including at least one member selected from the group consisting of aluminium oxide pillared clay, cerium modified alumina pillared clay, and metal oxide pillared clay. The support may also be zeolite β, zeolite Y, zeolite X, MFI, MEL, NaX, NaY, faujasite, mordenite, alumina, zirconia, titania and alumina silicates. The preferred support is mesoporous silica.

The support may also be calcined and we have found that when using a silica support, calcination alters the nature of the surface hydroxyl groups in the silica. Calcination produces isolated as opposed to vicinal hydroxyl groups which leads to a different interaction with the Lewis acid which in turn leads to a different polymerization reaction. Calcination has been found to improve resin yield and decrease the production of the by-product known as fill.

The pore size of the support should be such that the monomer has access to the catalytic species. Furthermore, the pore size should be such that it is not readily clogged with the polymeric resin once formed. We have found that in order to obtain satisfactory resin yields the pore size should be at least 100 Å, by "pore size" we mean the narrowest cross-section of the pore. This may be the diameter of the orifice or the neck of the pore, which in some instances is narrower than the orifice.

The amount of catalyst that is loaded onto the support also has a significant effect on the properties of the resin obtained. We have found that yield increases with increased catalyst loading with good control of resin molecular weight up to a certain loading level. The optimum level depends upon the nature of the Lewis acid and the nature of the support however above this level the control of molecular weight is lost and resins of too high molecular weight are produced. By way of example when using an aluminium chloride catalyst supported on K 100 silica yield increases as the catalyst loading increases to about 1.70 mmols $AlCl_3$/g but at higher loadings high molecular weight materials are produced. This is believed to be because at these higher loadings there is unsupported $AlCl_3$ present and the system operates, at least to some extent, as a homogeneous system.

The Lewis acid should be added to the support in a way that ensures reaction. We have found it convenient to add the Lewis acid to a slurry of the support in an inert solvent. The slurry should then be stirred for long enough, under conditions which allow the Lewis acids to react with the active sites on the support. The reaction conditions depend on the nature of the Lewis acid and the support. Whilst it may not be possible to obtain 100% reaction between the support and the Lewis acid, we have found that the greater the degree of reaction the better. However the conditions, during and/or after treatment, should be such that free acids or alkanes formed during the reaction of the support and the Lewis acid are largely removed. The extent of the reaction between the Lewis acid and the support can be monitored by measuring the amount of acid released by the reaction. For example when a Lewis acid such as $AlCl_3$ reacts with hydroxyl groups on the surface of silica to form a chemical bond, HCl will be produced. For every mole of $AlCl_3$ used in the catalyst preparation, one mole of HCl will be evolved. However, for physisorbed species where no chemical bond is formed, no HCl is produced. Accordingly, measurement of the amount of HCl produced during the catalyst preparation gives a measure of the extent of the reaction. We have found that when aluminium trichloride is the Lewis acid and mesoporous silica the support, mixing under reflux conditions and/or at temperatures at/or above 100° C. for longer than one hour, such as 1 to 4 hours, provides the active catalyst.

Because the acid sites are an integral part of the supported catalyst contamination of the resin products or solvents with catalyst residues is minimal. As a result, the catalysts impart less undesirable colour to the hydrocarbon resins, which in turn have a reduced level of undesirable colour.

The supported catalysts used in the present invention can generally be regenerated and recycled to thereby minimise waste disposal of spent catalyst. In contrast, unsupported Lewis acids are generally single use catalysts.

Further, the supported catalysts of the present invention are non-hazardous when compared with traditional unsupported Lewis acid catalysts such as $BF_3$ and $AlCl_3$. The catalysts of the present invention generally do not generate corrosive or hazardous liquid or gaseous acids on exposure to moisture.

In the reaction the feedstream may be added to a slurry of the catalyst in a solvent or may be passed over a fixed bed of the catalyst. Alternatively, the feedstream may be co-fed with a slurry of the catalyst into a reactor.

The polymerization may be carried out as a continuous process or as a batch process. A reaction time in a batch process is 30 minutes to 8 hours, preferably 1 hour to 4 hours at a reaction temperature between −50° C. and 150° C., preferably between −20° C. and 100° C., and more preferably between 0° C. and 70° C. Polymerization may be stopped by removing the catalyst from the hydrocarbon resin for example by filtration. The hydrocarbon resin may be removed from a fixed bed reactor, which includes the catalyst. The hydrocarbon resin may be stripped to remove unreacted monomers, solvents, and low molecular weight oligomers. The unreacted monomers, solvents, and low molecular weight oligomers may be recycled.

Typically the resulting hydrocarbon resin has a number average molecular weight (Mn) of 400 to 2000, a weight average molecular weight (Mw) of 500 to 3500, a Z average molecular weight (Mz) of 700 to 15,000 and a polydispersity (PD) as measured by Mw/Mn between about 1.5 and 4, where Mn, Mw, and Mz are determined by size exclusion chromatography (SEC).

The monomer feed can be co-polymerized with $C_4$ or $C_5$ olefins or dimers as chain transfer agents. Up to 40 wt % preferably up to 20 wt % of chain transfer agents may be added to obtain resins with lower and narrower molecular weight distributions than can be prepared from using the monomer feed alone. Chain transfer agents stop the propagation of a growing polymer chain by terminating the chain in a way which regenerates a polymer initiation site. Components, which behave as chain transfer agents in these reactions include but are not limited to isobutylene, 2-methyl-1-butene, 2-methyl-2-butene or dimers or oligomers of these species. The chain transfer agent can be added to the reaction in pure form or diluted in a solvent.

Preferred solvents are aromatic solvents. Typically toluene, xylenes, or light aromatic petroleum solvents. These solvents can be used fresh or recycled from the process. The solvents generally contain less than 200 ppm water, preferably less than 100 ppm water, and most preferably less than 50 ppm water and are preferably dry.

Another difficulty, particularly when polymerising refinery streams, is that very small amounts of impurities, such as oxygen and sulphur species present in the feed, can poison the catalyst, so reducing its activity. Furthermore the presence of small amounts of undesirable polymerizable materials and/or materials susceptible to alkylation particularly those which are more reactive than the bulk of the feed can reduce the yield of the polymerization reaction and adversely impair resin properties such as molecular weight and molecular weight distribution.

In a further embodiment the present invention therefore seeks to overcome these problems and to provide a commercially viable process for the production of petroleum resins, particularly from $C_4$ to $C_6$ and/or $C_8$ to $C_9$ refinery feedstreams with increased yield, which can tolerate impurities and undesirable polymerizable materials in the feed. We have now found that this may be accomplished using the present invention if the feed is pre-treated. In one embodiment the pre-treatment may be with a Lewis acid or ion exchanged clay. This selective pre-treatment of the feeds when using supported Friedel-Crafts catalysts for the production of resins can both increase resin yield and enhance resin properties.

In another aspect the present invention therefore provides a two-stage process for the production of hydrocarbon resins wherein a refinery feedstream containing unsaturated $C_4$ to $C_6$ and/or $C_8$ to $C_9$ monomers is polymerized by the process of the present invention in which the feed is first selectively reacted to remove impurities and undesirable polymerizable materials and/or materials susceptible to alkylation.

The selective reaction in the first stage of this process typically increases the molecular weight of the impurities and undesirable polymerizable monomers, so they cannot impair the polymerization reaction. Examples of such reactions are alkylation or oligomerization, for example thiophenes can be alkylated and small amounts of over active monomers such as cyclopentadiene and its derivatives can be oligomerized. It is therefore preferred that the selective reaction be performed in the presence of an alkylation and/or polymerization catalyst such as Lewis acids and ion exchanged clay. Lewis acids are preferred. In addition the selective reaction may involve some adsorption of impurities, such as oxygen containing materials for example aldehydes and ketones. The preferred Lewis acid depends upon the nature of the feed, weaker Lewis acids may be used in the pre-treatment reaction whilst the stronger acids may be used as polymerization catalysts.

We have therefore found that if the feed is first treated with a Lewis acid under conditions not conducive to bulk polymerization the yield in the subsequent polymerization reaction is significantly increased. For example the treatment maybe with weaker acids or with stronger acids in amounts less than that required for polymerization and/or for a length of time insufficient for polymerization.

The preferred conditions in the pre-treatment depend upon the nature of the feed and the nature and amount of the Lewis acid. We have found that the time for the pre-treatment should be short, times of a few minutes such as from 1 to 10 minutes, preferably 5–10 minutes when using supported $AlCl_3$ for the pre-treatment of a raw $C_4$ to $C_6$ feed being suitable. It is believed that this pre-treatment both removes impurities such as sulphur, oxygen and nitrogen species some of which may be susceptible to alkylation which would otherwise poison the polymerization catalyst. The pre-treatment may also polymerize or alkylate some of the more active unsaturated species, which can have an adverse effect during the polymerization reaction.

The Lewis acid used in the first stage may be the same as or different from the Friedel-Crafts Catalyst used in the polymerization stage. Examples of Lewis acids include halides of metals and non-metals and alkyl metal halides including chlorides, bromides and fluorides. The halides of metals and non-metals such as zinc, boron, iron, tin, zirconium, titanium hafnium, antimony, tantalum, scandium, yttrium, lanthanum, niobium and itrium may be used.

Alternatively or in addition, the feed is preferably pre-treated to remove moisture. We have found that this is particularly useful to reduce halides in the resin. The chloride level in by-products formed in the process of the present invention may also be reduced. When aluminium chloride is used as the supported catalyst in the process of the present invention, we have found that the removal of water from the feed results in a considerable reduction in the chlorine content of the resin and the low molecular weight fill that is produced in resin production and also of the raffinate. This has particular benefits if the raffinate is subsequently used as a fuel component, where there is a need for lower chlorine levels or if the products are further treated in a technique such as hydrogenation where chlorine can damage the catalyst or the hydrogenation unit.

It is believed that moisture present in the feed will attack the bonds between the support, the metal and the halide such as the Si—O—Al—$Cl_2$ bonds when silica is the support and aluminium trichloride the metal halide. This attack produces acids such as hydrochloric acid that in turn attack unsaturation in the resin, the fill, and the raffinate to produce chlorides in the product.

Any material that will remove the moisture may be used although we find that alumina is particularly preferred. Treatment should be performed after any washing, which is typically used to remove undesirable carbonyls.

An important variable in the polymerization reaction conditions, is the amount of supported catalyst which is used. It is preferably used at a level of 0.1 wt % to 30 wt % based on the weight of the unsaturated monomer in the feed, more preferably 0.5 wt % to 30 wt %, more preferably 1 wt % to 20 wt %, and most preferably 3 wt % to 15 wt %.

A second important variable in the polymerization reaction is the reaction sequence, i.e., the order and manner in which reactants are combined. In one reaction sequence, the catalyst can be added to a solution of the monomers incrementally while controlling the reaction temperature. Alternatively, in another reaction sequence, the monomer can be added incrementally to a slurry of the catalyst in a solvent. For a set catalyst level and reaction temperature, substantially lower softening point resins are obtained when the monomer is added to a catalyst slurry. Lower molecular weights and narrow polydispersity (PD), i.e., Mw/Mn, as measured by size exclusion chromatography, are obtained when the monomer is added to the catalyst solution compared with resins where the catalyst is added to the monomer.

Taking into consideration the effect of the reaction sequence, it is expected that polydispersities are obtained which are more narrow than those obtained using traditional unsupported Lewis acid Friedel-Crafts catalysts. Narrow polydispersity is important to ensure compatibility of resin with polymers in end use applications.

A third important variable is the polymerization reaction temperature. Polymerization temperatures between −50° C. and 150° C. can be used, however, more preferred temperatures are between −20° C. and 100° C., even more preferred between −20° C. and 70° C. and most preferably between −10° C. and 70° C. Temperature is found to have a significant effect on the properties of the resulting resins and the optimum temperature will depend on the nature of the feed and the catalyst used.

Higher molecular weight and high softening point resins are prepared at lower reaction temperatures. The reaction time is preferably between 30 minutes and 8 hours, and more preferably between 1 and 4 hours.

The process of the present invention can be a continuous, semi-batch, or batch process in such diverse reactors as continuous, batch, semi-batch, fixed bed, fluidised bed, and plug flow. For instance, in a preferred embodiment employing feed pre-treatment, a solution of the monomers can be first passed continuously over the Lewis acid and/or alumina in a fixed pre-treatment bed and subsequently passed over the supported aluminium trichloride catalyst in a second fixed bed. Alternatively the monomers can be co-fed with the Lewis acid in the form of a slurry into a continuous reactor and then passed to a second continuous reactor to which it is fed with a slurry of the supported aluminium trichloride catalyst.

The polymerization reaction may be stopped by physically separating the catalyst from the products. Physical separation may render the reaction solution neutral. Furthermore, physical separation can be performed by simple filtration or by separation of the resin solutions from a fixed catalyst bed. As a result, acid functionality and catalyst residue are not left in the resin product.

The petroleum resins find a major use as tackifiers in adhesives and are also used as polymer modifiers. Molecular weight is one important property of the resin. When homogeneous unsupported catalysts are used it is necessary to control the feed composition to produce materials of the desired molecular weight (typically an $M_n$ below 5000 and on $M_{z\ below}$ 7000). Standard practices are to add olefins to control molecular weight and molecular weight distribution and typically a diolefin to olefin ratio in the feed of less than I is required. We have found that the use of the techniques of the present invention result in high yields of the desired low molecular weight material and molecular weight distribution at diolefin to olefin ratios above 1.

The yield of resin, fill and raffinate as measured by the fraction of the total polymerization made up of that particular component. When resins are produced useful resin and low molecular weight by product known as "fill" is produced. The amount of resin and fill produced varies according to the nature of the feed and the type of catalyst. When using a homogeneous catalyst the yield of resin generally increases as the diolefin to olefin ratio in the feed increases.

However, as set out above, although the resin yield is increased, the product typically develops an undesirably high molecular weight and molecular weight distribution if the ratio exceeds 1. We have found that use of the techniques of the present invention result in high yields of the desirable low molecular weight material at diolefin to olefin ratios above 1.

In operation of the present invention considerable amounts of resin remain on the catalyst, which does not happen with a homogeneous catalyst system. These are not taken into account in the yields quoted in this application, but they would be recovered in a commercial operation.

After the resin is produced, it may be subjected to hydrogenation to reduce coloration and improve colour stability.

The hydrogenation of hydrocarbon resins may be carried out via molten or solution based processes by either a batch wise or, more commonly, a continuous process. Catalysts employed for the hydrogenation of hydrocarbon resins are typically supported monometallic and bimetallic catalyst systems based on group 6, 8, 9, 10 or 11 elements. Catalysts such as nickel on a support (for example, nickel on alumina, nickel on charcoal, nickel on silica, nickel on kieselguhr, etc), palladium on a support (for example, palladium on silica, palladium on charcoal, palladium on magnesium oxide, etc) and copper and/or zinc on a support (for example copper chromite on copper and/or manganese oxide, copper and zinc on alumina, etc) are good hydrogenation catalysts. The support material is typically comprised of such porous inorganic refractory oxides as silica, magnesia, silica-magnesia, zirconia, silica-zirconia, titania, silica-titania, alumina, silica-alumina, alumina-silicate, etc, with supports containing y-alumina being highly preferred. Preferably, the supports are essentially free of crystalline molecular sieve materials. Mixtures of the foregoing oxides are also contemplated, especially when prepared as homogeneously as possible. Among the useful supports materials in the present invention are the supports disclosed in the U.S. Pat. Nos. 4,686,030, 4,846,961, 4,500,424, and 4,849,093. Preferred supports include alumina, silica, carbon, MgO, $TiO_2$, $ZrO_2$, $FeO_3$ or mixtures thereof Any of the known processes for catalytically hydrogenating hydrocarbon resins can be used to hydrogenate the resins of this invention; in particular the processes of U.S. Pat. No. 5,171,793, U.S. Pat. No. 4,629,766, U.S. Pat. No. 5,502,104 and U.S. Pat. No. 4,328,090 and WO 95/12623 are suitable. Generic hydrogenation treating conditions include reactions in the temperature range of about 100° C. to 350° C. and pressures of between five atmospheres (506 kPa) and 300 atm (30390 kPa) hydrogen, for example, 10 to 275 atm (1013 kPa to 27579 kPa). In one embodiment the temperature is in the range including 180° C. and 320° C. and the pressure is in the range including 15195 kPa and 20260 kPa hydrogen. The hydrogen to feed volume ratio to the reactor under standard conditions (25° C., 1 atm (101 kPa) pressure) typically can range from 20–200, for water-white resins 100–200 is preferred.

Another suitable process for hydrogenating the resin of this invention is that described in EP 0 082 726. EP 0 082 726 describes a process for the catalytic or thermal hydrogenation of petroleum resins using a nickel-tungsten catalyst on a gamma-alumina support wherein the hydrogen pressure is $1.47 \times 10^7$–$1.96 \times 10^7$ Pa and the temperature is in the range of 250° C. to 330° C. Thermal hydrogenation is usually performed at 160° C. to 320° C., at a pressure of $9.8 \times 10^5$ to $11.7 \times 10^5$ Pa and for a period typically of 1.5 to 4 hours. After hydrogenation the reactor mixture may be flashed and further separated to recover the hydrogenated resin. Steam distillation may be used to eliminate oligomers, preferably without exceeding 325° C. resin temperature.

In a preferred embodiment, the hydrogenation is carried out by contacting the resin in the presence of hydrogen and hydrogenation catalyst metal compounds supported on porous refractory substrate particles having:
  a) mean maximum diffusion path length less than or equal to twice the hydraulic radius
  b) a pore volume distribution wherein;
    i) pores having diameters >150,000 Å constitute greater than about 2% of the total volume
    ii) pores having diameters >20,000 Å and <150,000 Å constitute greater than about 1% of the total volume, and
    iii) pores having diameters >2,000 Å and <20,000 Å constitute greater than about 12% of the total volume, and,
  c) a total pore volume of from 45% to 86% of the total volume of the substrate particles.

In a particularly preferred embodiment, the catalyst comprises nickel and/or cobalt on one or more of molybdenum, tungsten, alumina or silica supports. In a preferred embodiment, the amount of nickel oxide and/or cobalt oxide on the support ranges from 2 to 10 wt %. The amount of tungsten or molybdenum oxide on the support after preparation ranges from 5 to 25 wt %. Preferably, the catalyst contains 4 to 7 wt % nickel oxide and 18 to 22 wt % tungsten oxide. This process and suitable catalysts are described in greater detail in U.S. Pat. No. 5,820,749.

In another preferred embodiment, the hydrogenation may be carried out using the process and catalysts described in U.S. Pat. No. 4,629,766. In particular, nickel-tungsten catalysts on gamma-alumina are preferred.

The resins of this invention may be combined with a base polymer to form an adhesive. Typical base polymers include homopolyethylene, ethylene copolymerized with up to 50 wt % of one or more $C_3$ to $C_{20}$ α-olefins, atactic poly-α-olefins, polypropylene, propylene copolymerized with up to 50 wt % of one or more of ethylene and/or $C_4$ to $C_{20}$-olefins, polybutene, ethylene vinyl acetate copolymers, low density polyethylene (density 0.915 to less than 0.935 g/cm$^3$) linear low density polyethylene, ultra low density polyethylene (density 0.86 to less than 0.90 g/cm$^3$), very low density polyethylene (density 0.90 to less than 0.915 g/cm$^3$), medium density polyethylene (density 0.935 to less than 0.945 g/cm$^3$), high density polyethylene (density 0.945 to 0.98 g/cm$^3$), EMA, copolymers of acrylic acid, polymethylmethacrylate or any other polymers polymerizable by a high-pressure free radical process, PVC, polybutene-1, isotactic polybutene, elastomers such as ethylene-propylene rubber (EPR), vulcanised EPR, EPDM, block copolymer elastomers such as diblocks, triblocks, mixtures thereof and radius in particular, SBS (Styrene-Butadiene-Styrene), SIS (Styrene-Isoprene-Styrene), nylons, polycarbonates, PET resins, crosslinked polyethylene, copolymers of ethylene and vinyl alcohol (EVOH), polymers of aromatic monomers such as polystyrene, copolymers of isobutylene and para-alkyl styrene, butyl rubber poly esters, high molecular weight HDPE, low molecular weight HDPE, graft copolymers generally, polyacrylonitrile homopolymer or copolymers, thermoplastic polyamides, polyacetal, polyvinylidine fluoride and other fluorinated elastomers, polyethylene glycols, polyisobutylene (PIB) or blends thereof In a preferred embodiment, the base polymer is selected from the group consisting of block copolymers of styrene and isoprene or butadiene, polyisoprene, butyl rubber, ethylene vinyl acetate copolymers, ethylene methyl acrylate copolymers, amorphous polypropylene, ethylene propylene diene terpolymer rubber, copolymers of ethylene and a $C_3$ to $C_{20}$ α-olefin, copolymers of propylene and ethylene or a $C_4$ to $C_{20}$-olefin, metallocene polyethylenes, metallocene polypropylenes, natural rubber, styrene butadiene rubber, copolymers of isobutylene and para-alkylstyrene. Particularly, preferred polymers are styrene-butadiene-styrene block copolymers, butyl rubber, natural rubber and styrene-butadiene rubber.

In a particular preferred embodiment, the base polymer is a SIS (Styrene-Isoprene-Styrene) block copolymer. In another particularly preferred embodiment the SIS block copolymer has a diblock content less than 10 wt %, preferably less than 5 wt %. Preferred base polymers are the styrene-isoprene-styrene block copolymer such as those commercially available from DEXCO POLYMERS under the trade name VECTOR®.

In another preferred embodiment, the base polymer is a polymer produced using a metallocene catalyst system. Typically, the metallocene homopolymers or copolymers are produced using mono- or bis-cyclopentadienyl transition metal catalysts in combination with an activator of alumoxane and/or a non-co-ordinating anion in solution, slurry, high pressure or gas phase. The catalyst system may be supported or unsupported and the cyclopentadienyl rings may be substituted or unsubstituted. Titanium, zirconium and hafnium are preferred transition metals. Several commercial products produced with such catalyst/activator combinations are commercially available from ExxonMobil Chemical Company in Baytown, Texas under the tradenames EXCEED™ and EXAC™ and from Dow Chemical Company under the tradename ACHIEVE™. For more information on the methods and catalysts/activators to produce such metallocene homopolymers and copolymers see WO 94/26816; WO 94/03506; EPA 277,003; EPA 277,004; U.S. Pat. No. 5,153,157; U.S. Pat. No. 5,198,401; U.S. Pat. No. 5,240,894; U.S. Pat. No. 5,017,714; CA 1,268,753; U.S. Pat. No. 5,324,800; EPA 129,368; U.S. Pat. No. 5,264,405; EPA 520,732; WO 92 00333; U.S. Pat. No. 5,096,867; U.S. Pat. No. 5,507,475; EPA 426 637; EPA 573 403; EPA 520 732; EPA 495 375; EPA 500 944; EPA 570 982; WO 91/09882; WO 94/03506 and U.S. Pat. No. 5,055,438.

The metallocene produced copolymers described above preferably have a composition distribution breadth index (CDBI) of 50% or more, preferably above 60%, even more preferably above 70%. In one embodiment, the CDBI is above 80%, even more preferably above 90%, even more preferably above 95%. In another particularly preferred embodiment, the polyethylene copolymer has a CDBI between 60 and 85%, even more preferably between 65 and 85%. Composition Distribution Breadth Index (CDBI) is a measure of the composition distribution of monomer within the polymer chains and is measured by the procedure described in PCT publication WO 93/03093, published Feb. 18, 1993. Fractions having a weight average molecular weight (Mw) below 15,000 are ignored when determining CDBI.

The resin may be present in the blend from 1 to 200 parts per 100 parts of base polymer in the adhesive formulation. In a preferred embodiment, the resin may be present in the blend from 25 parts to 200 parts per 100 parts of polymer. In another embodiment, the preferred range is 80 to 120 parts resin per 100 parts polymer.

The adhesive formulations may also contain additives well known in the art such as anti-block, anti-stat, antioxidants, UV stabilisers, neutralisers, lubricants, surfactants and/or nucleating agents. Preferred additives include silicon dioxide, titanium dioxide, polydimethylsiloxane, talc, dyes, wax, calcium stearate, carbon black and glass beads.

The resins of this invention may be used in pressure sensitive adhesives, hot metal adhesives or contact adhesives which can be used in applications such as tapes, labels, paper impregnation, hot melt adhesives including woodworking, packaging, bookbinding or disposables, sealants, rubber compounds, pipe wrapping, carpet backing, contact adhesives, road-marking or tire construction.

In a particularly preferred embodiment, the resins are formulated into a pressure sensitive adhesive application. Such a pressure sensitive adhesive composition may be applied to any conventional backing layer such as paper, foil, polymeric foil, release liners, woven or non-woven backing material to make for example, packaging tapes.

The resins of the current invention can also be used as modifiers in adhesives, sealants, printing inks, protective coatings, plastics, polymer films; construction applications such as road markings, flooring, paper additives and as dry cleaning re-texturizing agents.

A particularly important use of these petroleum resins is as tackifiers in adhesive systems such as solvent based adhesives, hot melt adhesives, pressure sensitive adhesives and water based systems. In such adhesive systems the petroleum resin acts as a tackifier for other polymers and rubbers used in the adhesive system. The choice of the polymer and/or the rubber depends on the nature of the adhesive and its particular application. For example hot melt adhesives frequently are based on ethylene containing copolymers, particularly ethylene/vinyl acetate copolymers. Pressure sensitive adhesives frequently are based on natural or synthetic rubbers such as styrene copolymer rubbers, solvent based adhesives may be aqueous emulsions or organic solvent based, although for environmental reasons aqueous systems are preferred. Examples of polymer systems useful in such aqueous adhesive systems are polyacrylate and polymethacrylate emulsions.

The present invention is illustrated by reference to the following Examples, in these Examples the yields do not include any resin that may remain on the catalyst surface.

EXAMPLE 1

Supported Aluminium Trichloride Preparation

Aluminium trichloride, 2.25 grams (16.9 mmols), was added to 70 ml of anhydrous toluene. The support material, 10 grams (K100 silica), was dried for 24 hours at 300° C. The dried support material was added to the aluminium trichloride solution and the resulting slurry stirred under reflux for two hours. A dreschel bottle containing 50 cc's of NaOH (1.0 mol cm$^3$) was connected to the top of the condenser and a flow of nitrogen was maintained over the reaction mixture to ensure that any HCl produced was carried up the condenser and bubbled through the NaOH. The amount of HCl produced in the reaction was determined by taking 5 cm$^3$ aliquots of the NaOH and backtitrating with HCl (1.0 mol dm$^{-3}$). 15.3 mmols of HCl were produced against a theoretical 16.9 mmols indicating that 92% of the AlCl$_3$ had reacted with the support. The solvent was removed under vacuum at room temperature to obtain a flowable powder. Prior to use, the material was stored and handled in an inert atmosphere and is known as Catalyst A A second catalyst, Catalyst B, was prepared using the same materials and apparatus by stirring the mixture of the aluminium trichloride and the support at ambient temperature for 2 hours according to WO 98/30587 in this instance only 0.33 mmols of HCl were produced indicating 20% reaction of the $AlCl_3$.

The two catalysts were compared in the polymerization of pure 4-methyl styrene and a mixed refinery $C_5$ feed containing:

35 wt % of a piperylene concentrate containing 68% pentadienes,

25% $C_5$ olefins and saturates 55 wt % of a $C_5$ feed containing 63% olefins, 3.7% diolefins and 33% saturates and 10% of a feed containing 98% saturated $C_5$ and $C_6$ hydrocarbons as solvent.

Polymerization

A two litre elongated flange flask with a bottom outlet tap was equipped with an overhead stirrer, reflux condenser, gas inlet, thermocouple, and a dropping funnel. The flask was charged with a slurry of 5 grams of the supported aluminium chloride (prepared as above) as catalyst in 15 ml anhydrous toluene. 450 ml of the feed was added to the nitrogen purged flask via the dropping addition funnel over 45 minutes. The reaction solution was stirred at room temperature for a total reaction time of ninety minutes. The resulting resin solution was separated from the catalyst by vacuum filtration at room temperature. The volatile components and solvent were removed by heating the reaction solution from 20° C. to 170° C. in 50° C. increments under vacuum for 3 hours.

The activity of Catalysts A and B was comparable with 4 methyl styrene 91% and 96% (yield) but whilst Catalyst A was active with the mixed refinery $C_5$ feed Catalyst B was inactive.

Example 2 is an example of feed pre-treatment using the supported aluminium trichloride catalyst for feed pre-treatment.

EXAMPLE 2

Supported Aluminium Trichloride Preparation

Aluminium trichloride, 2.25 grams (16.9 mmols), was added to 70 ml of anhydrous toluene. The support material, 10 grams (K100 silica), was dried for 24 hours at 300° C. The dried support material was added to the aluminium trichloride solution and the resulting slurry stirred under reflux conditions for two hours. The solvent was removed under vacuum at room temperature to obtain a flowable powder. Prior to use, the material was stored and handled in an inert atmosphere.

Feed Pre-treatment

A three-necked litre round bottom flask was equipped with a stirrer bar, gas inlet and reflux condenser. The flask was charged with 450 ml of a $C_5/C_6$ feed of composition comprising a mixture of 35% of a piperylene concentrate containing 68% pentadienes, 25% $C_5$ olefins and saturates of a $C_5$ feed containing 63% olefins, 3.7% diolefins and 33% saturates and 10% of a feed containing 98% saturated $C_5$ and $C_6$ hydrocarbons. 2.5 grams of the supported aluminium trichloride, prepared as above, were added. Prior to use, the feed mixture had been dried overnight using 10 grams 4A molecular sieves. The mixture was stirred at room temperature for 7 minutes. The resulting feed was then removed from the catalyst by vacuum filtration at room temperature and the peroxide content of the feed was found to have been reduced from 148 to 113 ppm and the sulphur content from 27 to 23 milligrams per litre.

Polymerization

A two litre elongated flange flask with a bottom outlet tap was equipped with an overhead stirrer, reflux condenser, gas inlet, thermocouple, and a dropping funnel. The flask was charged with a slurry of 5 grams of the supported aluminium chloride (prepared as in Example 1) as catalyst in 15 ml anhydrous toluene. 450 ml of the pre-treated $C_5$ aliphatic feed was added to the nitrogen purged flask via the dropping addition funnel over 45 minutes. The reaction solution was stirred at room temperature for a total reaction time of ninety minutes. The resulting resin solution was separated from the catalyst by vacuum filtration at room temperature. The volatile components and solvent were removed by heating the reaction solution from 20° C. to 170° C. in 50° C. increments under vacuum for 3 hours.

The results are shown below.

For comparison the polymerization reaction was repeated with the same feed but without feed pre-treatment using 5 grams of catalyst (Comparative Example A) and also using 7.5 grams of catalyst (Comparative Example B).

|  | Catalyst Amount grams | Yield (grams of resin) |
| --- | --- | --- |
| Comparative A (No pre-treatment) | 5 | 11 |
| Comparative 13 (No pre-treatment) | 7.5 | 12 |
| Invention | 2.5 pre-treatment 5 normal reaction | 18 |

From these results it can be concluded that the use of a pre-treatment stage improves the resin yield.

EXAMPLE 3

The following polymerizations were carried out following the procedure of Example 2, the only changes being the length of time of the pre-treatment, the results were:

| Catalyst Amount grams | Time of pre-Treatment minutes | Yield (grams of resin) |
| --- | --- | --- |
| 5 | 0 | 11 |
| 7.5 | 0 | 12 |
| 2.5 pre-treatment 5 normal reaction | 7 | 16 |
| 2.5 pre-treatment 5 normal reaction | 30 | 15 |
| 2.5 pre-treatment 5 normal reaction | 90 | 18 |

As can be seen from the table, the length of the pre-treatment stage has little effect on the yield of the resin. These findings indicate that it is the initial contact between the $AlCl_3$ and the feed, which results in the enhancement of the yield.

EXAMPLE 4

The feed used in Example 1 was polymerized using the catalyst and process of Example 1, in some of the runs the feed was pre-treated by washing and treatment with alumina. The runs were compared with a similar run using a homogeneous catalyst.

In each run the product was separated into resin, fill and raffinate and the chlorine content of these products are set out in the table and the chlorine contents are shown in the bar chart of FIG. 1.

| Run No: | A | B | C | D | E | F |
|---|---|---|---|---|---|---|
| Catalyst Loading | Homogeneous | Homogeneous | AlCl3/SiO2 1.69 mmol/g | AlCl3/SiO2 1.69 mmol/g | AlCl3/SiO2 1.2 mmol/g | AlCl3/SiO2 1.69 mmol/g |
| Pretreated | No | No | No | Yes | Yes | Yes |
| Diolefin:Olefin | 0.61 | 0.61 | 0.61 | 0.61 | 0.79 | 0.79 |
| Diolefin + Olefin % | 67.00 | 67.00 | 67.00 | 67.00 | 67.00 | 67.00 |
| Total feed ml | 600.00 | 600.00 | 600.00 | 600.00 | 600.00 | 600.00 |
| Total polymzate ml | | 586.00 | 500.00 | 526.00 | 499.00 | 469.00 |
| Raffinate % | | 57.00 | 78.00 | 70.00 | 60.50 | 62.00 |
| Fill % | | 5.00 | 3.00 | 7.00 | 13.00 | 11.00 |
| Resin % | | 33.00 | 9.00 | 17.00 | 22.00 | 19.00 |
| Cl Content ppm | | | | | | |
| Raffinate | 2,300.00 | 3,400.00 | 690.00 | 122.00 | 100.00 | 132.00 |
| Fill | 1,500.00 | 1,500.00 | 3,200.00 | 659.00 | 486.00 | 412.00 |
| Resin | 198.00 | 477.00 | 2,100.00 | 629.00 | 443.00 | 328.00 |
| Approx. H2O in feed ppm | | 150 | 150 | 50 | 50 | 50 |

EXAMPLE 5

Runs were performed in which the olefin to diolefin ratio in the feed was varied by adjusting the ratios of feed components A, B and C used in Example 1. The feeds were polymerized using homogeneous and heterogeneous catalysts.

The polymerization conditions, resin yield, yield of fill, softening point, molecular weight and molecular weight distribution of the resins were determined and the results are shown in the following tables and charts.

| Runs: | $AlCl_3$ Homo | $AlCl_3$ Homo | $AlCl_3$ Homo | $AlCl_3$ Homo | $AlCl_3$ Homo | $AlCl_3$ Homo | $AlCl_3$ Homo | $AlCl_3$ Hetero | $AlCl_3$ Hetero | $AlCl_3$ Hetero | $AlCl_3$ Hetero | $AlCl_3$ Hetero | $AlCl_3$ Hetero | $AlCl_3$ Hetero |
|---|---|---|---|---|---|---|---|---|---|---|---|---|---|---|
| D/O | 0.61 | 0.79 | 1.00 | 1.00 | 1.00 | 1.15 | 1.50 | 0.61 | 0.79 | 1.00 | 1.00 | 1.00 | 1.15 | 1.50 |
| D + O | 67 | 67 | 50 | 64 | 79 | 64 | 65 | 67 | 67 | 50 | 64 | 79 | 64 | 65 |
| Yield of Resin % | 34 | 38 | 32 | 40 | 49 | 42 | 46 | 20 | 22 | 20 | 28 | 32 | 27 | 17 |
| Yield of Fill % | 3 | 4 | 1 | 2 | 2 | 1 | 2 | 8 | 13 | 7 | 6 | 7 | 3 | 1 |
| SP ° C. | 88 | 92 | 96 | 87 | 89 | 89 | 100 | 70 | 71 | 69 | 65 | 61 | 61 | 54 |
| Mn | 1160 | 1370 | 1440 | 1380 | 1510 | 1620 | 1760 | 1050 | 1170 | 1310 | 1280 | 1570 | 1490 | 1710 |
| Mw | 1790 | 2290 | 2930 | 2850 | 2710 | 3460 | 4010 | 1570 | 1810 | 2180 | 2240 | 2790 | 3010 | 3930 |
| Mz | 2820 | 3880 | 9370 | 5750 | 4800 | 9750 | 9160 | 2360 | 2840 | 3620 | 3800 | 5170 | 548*0 | 12500 |
| Mw/Mn | 1.54 | 1.67 | 2.03 | 2.07 | 1.79 | 2.14 | 2.28 | 1.5 | 1.55 | 1.66 | 1.75 | 1.78 | 2.02 | 2.3 |

D/O = Diolefin:Olefin ratio
D + O = Diolefin plus Olefin %

| | Comparisons at the same diolefin/olefin ratios show | | | | | | | |
|---|---|---|---|---|---|---|---|---|
| | AlCl3 Homo | AlCl3/SiO2 Hetero | AlCl3 Homo | AlCl3/SiO2 Hetero | AlCl3 Homo | AlCl3/SiO2 Hetero | AlCl3 Homo | AlCl3/SiO2 Hetero |
| D + O | 67 | 67 | 67 | 67 | 64 | 64 | 64 | 64 |
| D/O | 0.61 | 0.61 | 0.79 | 0.79 | 1.00 | 1.00 | 1.15 | 1.15 |
| Yield of resin | 34 | 20 | 38 | 22 | 40 | 28 | 42 | 27 |
| Yield of Fill | 3 | 8 | 4 | 13 | 2 | 6 | 1 | 3 |
| SP | 88 | 70 | 92 | 71 | 87 | 65 | 89 | 61 |
| Mn | 1160 | 1050 | 1370 | 1170 | 1380 | 1280 | 1620 | 1490 |
| Mz | 2820 | 2360 | 3880 | 2840 | 5750 | 3800 | 9750 | 5480 |

| | | | | |
|---|---|---|---|---|
| D/O | 0.61 | 0.79 | 1.00 | 1.15 |
| Mz Homo | 2820 | 3880 | 5750 | 9750 |
| Mz Hetero | 2360 | 2840 | 3800 | 5480 |
| SP Homo | 88 | 92 | 87 | 89 |
| SP Hetero | 70 | 71 | 65 | 61 |

Figure 2:
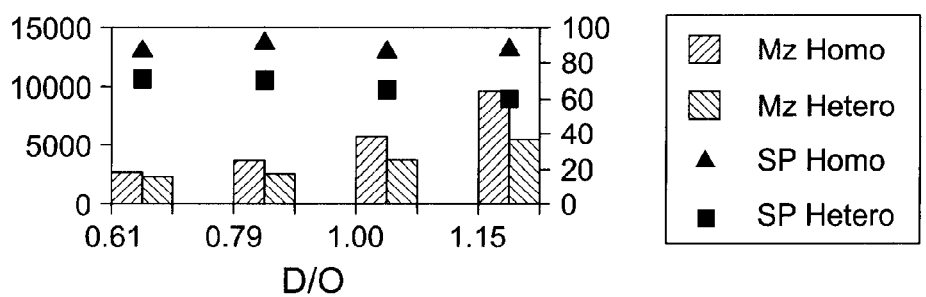
FIG. 2 is a graph showing Z average molecular weight and softening point versus the diolefin-olefin ratio.
Figure 3:
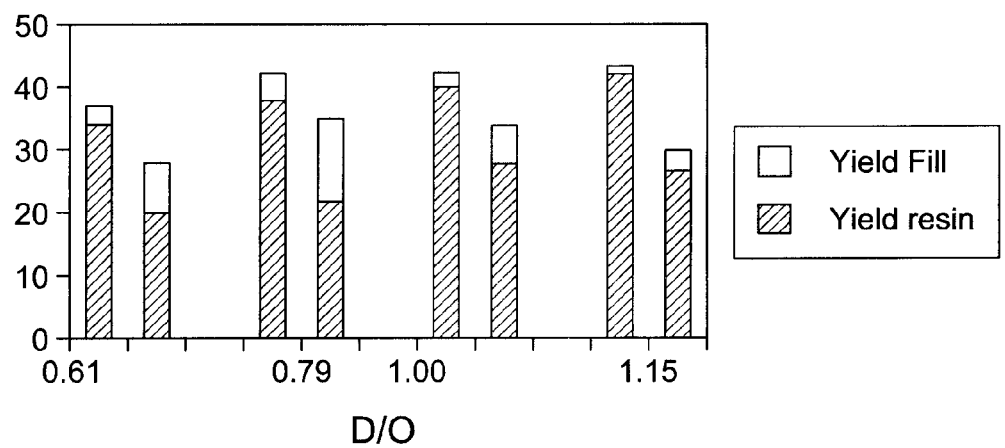
FIG. 3 is a graph of yield versus diolefin-olefin ratio.
Figure 4:
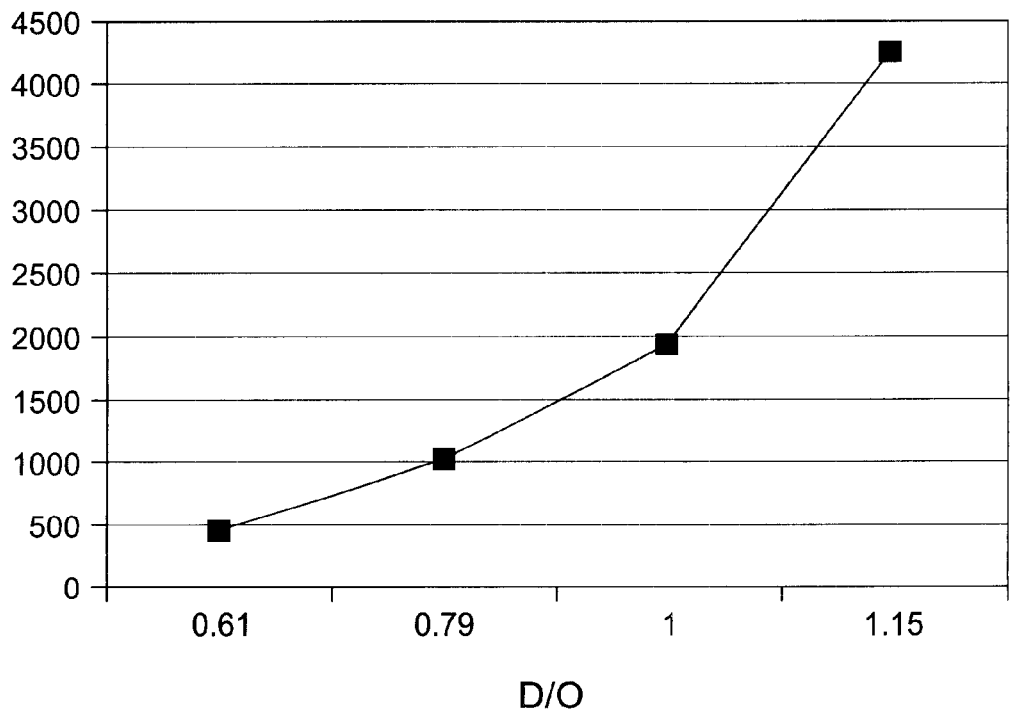
FIG. 4 is a graph of the change in Z average molecular weight verses the diolefin-olefin ratio.

The Table below and FIGS. 2 and 3 show the properties for the following systems:

The data shows that as the diolefin/olefin ratio increases the difference in the Mz for the heterogeneous catalyst and the homogeneous catalyst increases and this difference is plotted in FIG. 1 below.

This clearly shows that the use of the heterogeneous catalyst enables adhesive grade resins to be obtained at higher diolefin to olefin ratios.

EXAMPLE 6

The effect of the pore size of a silica support used for the catalyst on the yield, fill and resin softening point was evaluated using silica supports of various pore size.

The pore size and resin properties are shown below:

| Silica | Pore diameter/A | BET Surface area/sq. m/g | Total pore vol/cc/g | Fill % | Yield % | Softening point ° C. | Molecular wt | | |
|---|---|---|---|---|---|---|---|---|---|
| | | | | | | | Mn | Mw | Mz |
| A | 100 | 299 | 1.03 | 13 | 22 | 71 | 1170 | 1810 | 2840 |
| B | 100 | 517 | 1.67 | 15 | 13 | 59 | 980 | 1380 | 2230 |
| C | 200 | 301 | 1.67 | 6 | 32 | 74 | 1360 | 2210 | 3620 |
| D | 300 | 272 | 2.01 | 2 | 21 | 56 | 1580 | 3240 | 7940 |
| E | 300 | 284 | 1.88 | 3 | 22 | 53 | 1550 | 3130 | 7610 |
| F | 20 | 1257 | 0.68 | 1 | 1 | 54 | 2080 | 5150 | 22000 |
| G | — | 192 | 0.52 | 5 | 32 | 67 | 1580 | 2930 | 5080 |

EXAMPLE 7

The procedure of Example 1 was repeated at various different catalyst loadings with the following results.

| Loading mmol/g | Mn | Mw | Mz | Yield | Softening point |
|---|---|---|---|---|---|
| 0.69 | 890 | 1180 | 1670 | 10 | 60 |
| 1.2 | 1060 | 1550 | 2400 | 19 | 64 |
| 1.69 | 1170 | 1810 | 2840 | 22 | 71 |
| 2.2 | 1670 | 3150 | 5430 | 22 | 71 |

EXAMPLE 8

The effect of calcinising the catalyst support when using silica K 100 as a support was evaluated using the supported catalyst, prepared as in Example 1. The feed and polymerization conditions were those used in Example 1.

The results are set out in the following table:

| | Calcined | Uncalcined |
|---|---|---|
| Yield % | 32 | 22 |
| Fill % | 2 | 13 |
| Mn | 1430 | 1170 |
| Mw | 2650 | 1810 |
| Mz | 6000 | 2840 |

We claim:

1. A process for the production of petroleum resins in which a resin producing feed is contacted with a supported Lewis acid catalyst, wherein the Lewis acid catalyst comprises a metal or a non-metal halide or alkyl halide reacted with a support containing surface hydroxyl groups, characterized in that hydrogen halides and/or alkenes formed by the abstraction of hydrogen from the surface hydroxyl groups of the support are removed prior to contacting the feed with the catalyst.

2. A process according to claim 1 in which the Lewis acid is aluminium trichloride or an aluminium alkyl halide.

3. A process according to claim 1 or claim 2 in which the support is mesoporous silica.

4. A process for the production of petroleum resins in which a resin producing feed is contacted with a supported Lewis acid catalyst wherein the Lewis acid catalyst comprises a metal or non-metal halide or alkyl halide reacted with a support containing surface hydroxyl groups characterised in that the Lewis acid and the support are reacted at a temperature above 100° C. for at least one hour.

5. A process according to claim 1 or claim 4 in which the support and the Lewis acid are reacted in an inert diluent under reflux conditions.

6. A process according to claim 1 or claim 4 in which the feed is a refinery feed.

7. A process according to claim 6 in which the feed is a $C_4$ to $C_6$ mixed olefine/diolefine feed.

8. A process according to claim 6 in which the feed is a mixed aliphatic/aromatic feed.

9. A process according to claim 1 or claim 4 in which the feed is first subjected to a chemical reaction to selectively react impurities and over-reactive monomers to reduce their adverse impact during polymerization.

10. A process according to claim 1 or claim 4 in which the feed is dried prior to contact with the supported catalyst.

11. A process according to claim 10 in which the feed is dried with alumina.

12. A process according to claim 1 or claim 4 in which the feed is washed.

13. A process according to claim 1 or claim 4 in which the catalyst loading is less than 1.70 mmols $g^{-1}$.

14. A process according to claim 1 or claim 4 in which the resin is hydrogenated.

15. A process for producing a component for adhesives, sealants, road marking materials, paper additives, inks, or polymer compositions comprising the step of supplying a resin produced according to claim 1 or claim 4.

* * * * *